H. B. SHERMAN.
ELECTRICAL CONNECTOR.
APPLICATION FILED JAN. 22, 1919.
1,352,032.
Patented Sept. 7, 1920.
2 SHEETS—SHEET 1.
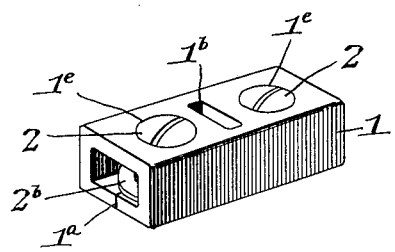
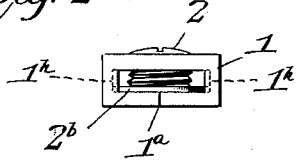
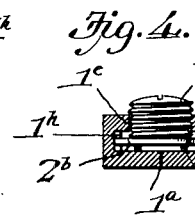
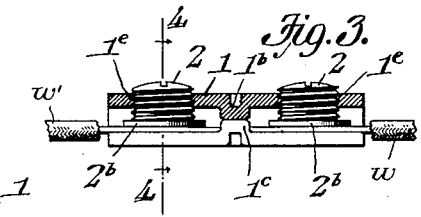
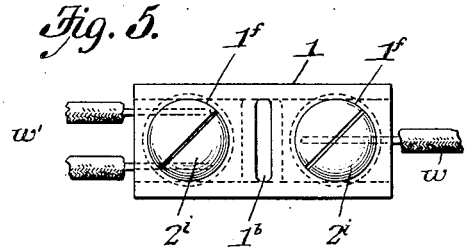
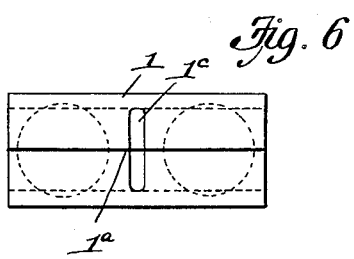
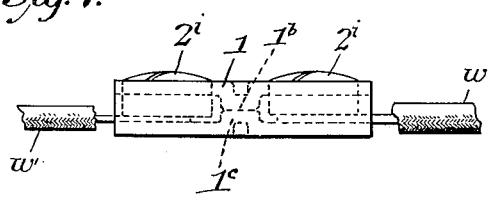
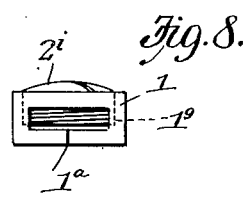
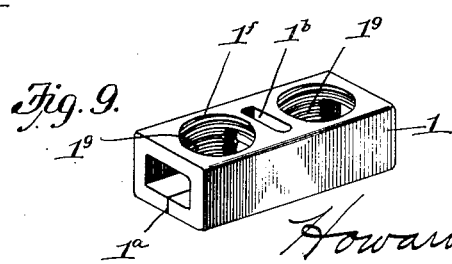
Inventor
Howard B. Sherman
By Alexander Lowell
Attorneys H. B. SHERMAN.
ELECTRICAL CONNECTOR.
APPLICATION FILED JAN. 22, 1919.
1,352,032.
Patented Sept. 7, 1920.
2 SHEETS—SHEET 2.
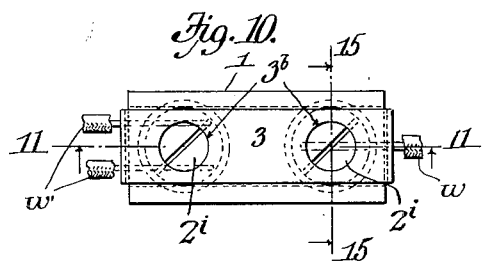
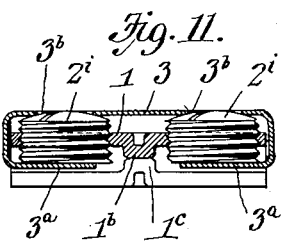
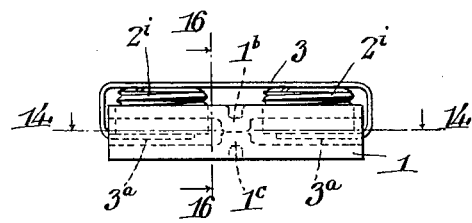
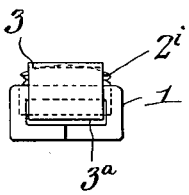
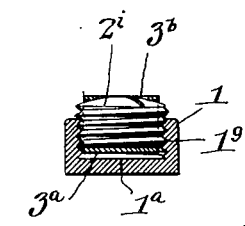
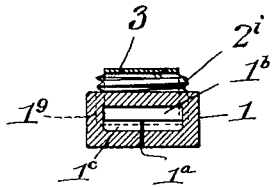
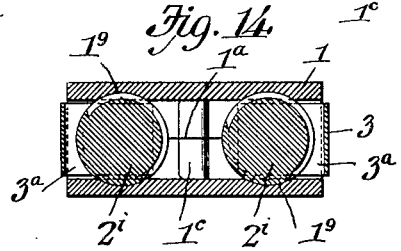
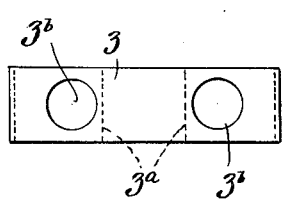
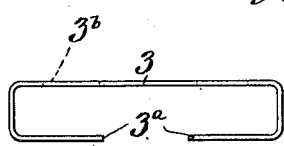
Inventor
Howard B. Sherman
By Alexander Powell
Attorneys

UNITED STATES PATENT OFFICE.

HOWARD B. SHERMAN, OF BATTLE CREEK, MICHIGAN.

ELECTRICAL CONNECTOR.

1,352,032.  Specification of Letters Patent.  Patented Sept. 7, 1920.

Application filed January 22, 1919. Serial No. 272,472.

*To all whom it may concern:*

Be it known that I, HOWARD B. SHERMAN, a citizen of the United States, residing at Battle Creek, in the county of Calhoun and State of Michigan, have invented certain new and useful Improvements in Electrical Connectors; and I hereby declare that the following is a full, clear, and exact description thereof, reference being had to the accompanying drawings, which form part of this specification.

This invention is a novel connector for electrical conductors and especially adapted for use in the installation of electric fixtures which are usually wired, and a connector is usually employed for connecting such wires to the electrical supply wires. The usual connector is a short metal sleeve the wires from the fixture being entered into one end of such sleeve and secured by a screw, and when the fixture is in place the end of the electrical supply wire is similarly connected to the other end of the sleeve by a similar screw. There may be a multiple of wires in the fixture all of which wires are usually of the same gage and the ends of such wires are entered into the same end of the sleeve and must be confined therein by the same screw. It is necessary to use separate set screws for the fixture wires and supply wires, because if the fixture wires and supply wires were of different gage one set screw could not properly secure them, because the smaller wire or wires would not be pinched or seated by such screw, as the larger wire would prevent the smaller wire being properly pinched by the screw. The said sleeve is also usually provided with some internal means, between the two set screws, to prevent wires inserted in one end of the sleeve projecting beneath the screw at the opposite end, which if the wires were not equal in diameter would cause the same difficulties which would arise if only one set screw were used.

These sleeve connectors are usually small and the screws short; the screws are therefore liable to be lost by being unscrewed too far in preparing the connector for engagement with the wires; that is, in running out the screws to get ready to put in the wires, the workmen frequently withdraw the screws too far and they drop out. As these connectors are frequently put up in dark rooms, and the screws are very short and small, if they drop out they are apt to be lost, or, at least, cause considerable annoyance and loss of time in searching for them. To prevent these annoyances the sleeves have sometimes been provided with means for preventing such running out of the screw.

The object of the present invention is to provide a simple and inexpensive sleeve connector with which both the fixture wires and the supply wire can be readily connected, such connector being so formed that the wires are prevented from over-lapping or passing each other, so that the screws will properly pinch the wires intended to be secured thereby. Also to provide novel means for retaining the set screws in place in the connector.

In the accompanying drawings I have illustrated some practical embodiments of the invention which I will describe to enable others to readily understand, adapt and use the invention; but I refer to the claims following the description for definitive statements of the novel essentials of the invention, and novel constructions and combinations of parts for all of which protection is desired.

In said drawings:

Figure 1 is a perspective view of one complete retainer embodying the invention.

Fig. 2 is an end view thereof.

Fig. 3 is a longitudinal sectional view thereof showing the wires in position.

Fig. 4 is a transverse section on the line 4—4, Fig. 3.

Fig. 5 is a top plan view of a modified form of the connector, showing the wires.

Fig. 6 is a bottom plan view thereof.

Fig. 7 is a side view of Fig. 5.

Fig. 8 is an end view of the retainer shown in Figs. 5 to 7.

Fig. 9 is a perspective view of the body of the connector shown in Figs. 5 to 8.

Fig. 10 is a top plan view of such connector with a screw-retainer connected therewith.

Fig. 11 is a longitudinal section on line 11—11, Fig. 10.

Fig. 12 is a side view of Fig. 10.

Fig. 13 is an end view of Fig. 12.

Fig. 14 is a horizontal section on line 14—14, Fig. 12.

Fig. 15 is a transverse section on line 15—15, Fig. 10.

Fig. 16 is a section on line 16—16, Fig. 12.

Figs. 17 and 18 are respectively top and side views of the screw retainer shown in Figs. 10–14 detached.

The main body 1 of the connector is of sleeve or box like form, preferably formed integrally out of a strip of sheet brass, so that it will be an excellent conductor. The strip is bent into a tube or sleeve preferably substantially rectangular in cross section and having comparatively wide top and bottom portions and two narrow side portions. The size and cross sectional conformation of this body however is not restricted to the particular form shown in the drawings.

The strip is so bent that the top and side portions are solid but the two ends of the plate meet at the center of the bottom portion which is longitudinally slitted, such slit being formed, as indicated at 1$^a$, between the meeting ends of the strip (see Figs. 1 and 6).

In the top portion of the body 1 is a preferably centrally disposed transverse inwardly projecting rib 1$^b$, which is preferably formed by pressing the strip so as to form a rib 1$^b$ therein, which rib will lie at the inner face of the top of the body, and be centrally disposed thereof, when the strip is bent to proper shape, the rib leaving a corresponding depression in the outer face of the top.

In the opposite ends of the strip are similarly pressed ribs 1$^c$ which, when the strip is bent to form the body, together make up an inwardly projecting transverse rib corresponding in length and contour to rib 1$^b$ and meeting therewith. The ribs 1$^b$, 1$^c$ when the strip is properly bent to form the body together constitute an internal partition extending across the inner space of the body and substantially closing same, so that wires ($w$, $w'$) inserted in either end of the body will be stopped by the partition 1$^b$—1$^c$ and cannot be passed through the body.

It will be seen that the blank strip for forming the body can be easily stamped out of sheet metal with the portions 1$^b$, 1$^c$ pressed therein, and afterward bent into the box or tube to form the finished body as shown in Figs. 1 and 9.

In the top wall of the body are formed screw threaded openings 1$^e$ at opposite sides of the wall 1$^b$; and each opening is engaged by a screw which (as shown in Figs. 1–4) is provided on its inner ends with an enlarged base or flange 2$^b$ that snugly fits between the side walls of the body and will prevent any wires ($w$, $w'$) inserted therein passing or squeezing beside the screw when it is clamped thereon, and insures that all the wires inserted under such screw will be engaged and held thereby when the screw is run down. The screw head 2$^b$ also prevents the screw from being backed out of the connector and lost.

In this form of connector the screws can be engaged with the openings 1$^e$ before the bottom portions of the body are folded into position, or before the strip is folded into its final shape.

If desired the side walls of the body may be provided with slight concavities as at 1$^h$, in their inner sides, beside the screws 2; into which concavities the sides of the screw flanges or heads 2$^b$ project (see Figs. 2 and 4) so as to insure that the smallest wires will be pinched between the screw head and bottom of the connector. That is, when the end of even a very small wire is inserted in the body it will be certainly caught by the screw, as it cannot clear the head thereof.

As shown in Figs. 5–9 and 14–16 the screw threaded openings 1$^f$ in the body are of slightly greater diameter than the inside width of the box, so that the threaded portions are formed on the inside walls of the box adjacent each opening 1$^f$, as indicated at 1$^g$. The object of this is to enable set screws 2$^i$ to be used, which screws are of greater diameter than the inside width of the body between the side walls thereof. The object of this is to insure that the ends of small wires inserted in the body shall be pinched by the screws; and to also provide increased threaded engaging surfaces for the screws 2$^i$ in the body.

These screws 2$^i$ are inserted in the body in the usual manner and are adapted to clamp the ends of the wires ($w$, $w'$) inserted therein and secure the same to the connector as indicated in the drawings.

As stated, the flanged screws 2, shown in Figs. 1 to 4, cannot be backed out of the body by reason of their flanges, and are securely and practically permanently but operatively connected therewith. The screws 2$^i$ (Figs. 5–8) might be disengaged from the body; to prevent this a retainer is preferably provided to hold the screws 2$^i$ in the body.

As shown in Figs. 10 to 18 the retainer is preferably formed of a strip 3 of sheet brass or other suitable material which strip extends across the top of the body and over the screws therein and has its ends 3$^a$ bent down and returned toward each other and entered within the opposite ends of the body as shown.

The ends 3$^a$ of the strip extend sufficiently into the box to securely hold the retainer on the body, and the retainer effectively prevents the screws being entirely withdrawn from the body. The retainer 3 is provided with openings 3$^b$ which are of less diameter than the screws and so located as to overlie the ends of the screws 2$^i$ and enable the screws to be readily engaged by a screwdriver.

Preferably the parts 3$^a$ of the retainer engage the inner ends of the screws (as shown in Figs. 11 and 15) so that the screws are loosely clamped between the body and ends of the retainer, and when a screw $2^1$ is run down the end of the retainer is forced down on top of the wire inserted thereunder, thereby making electric connection therewith.

The manner of using the connector is sufficiently set forth above and indicated in the drawings. It will be obvious therefrom that the invention provides a simple, efficient, practical connector for the purposes specified. Such connector could also be used to connect adjacent ends of other objects which could be inserted (or provided with portions that could be so inserted) in the ends of the body and clamped by the screws. The capabilities and advantages of the invention will be readily appreciated by those familiar with this class of devices.

What I claim is:

1. A connector for the purpose described, comprising a tubular body portion having screw threaded openings in its top and recesses in its inner side walls adjacent and of greater diameter than these openings, and a partition intermediate the said openings; screws engaging said openings and provided with flanges on their inner ends engaging said recesses to prevent withdrawal of the screws.

2. A tubular connector provided with a partition formed by pressing a portion of its body walls abruptly across the passageway through the connector without essentially distorting the general contour of the body of the connector, threaded openings in the walls of the connector on opposite sides of said partition, and screws engaging such openings.

3. A tubular connector provided with a screw threaded opening through its walls, the normal passageway through the tube being enlarged adjacent the threaded opening by recesses formed in the inner walls of the connector, a screw threaded into said opening and extending into said passageway and of a length exceeding the largest transverse normal dimension of the passageway and an enlargement on the inner end of the screw extending entirely across the passageway and into the recesses within the tube.

In testimony that I claim the foregoing as my own, I affix my signature.

HOWARD B. SHERMAN.